(12) United States Patent  (10) Patent No.: US 6,582,017 B1
Barnes et al.  (45) Date of Patent: Jun. 24, 2003

(54) MODULAR SHOPPING CART CUSHION FOR INFANTS AND SMALL CHILDREN

(76) Inventors: James W. Barnes, P. O. Box 426, Creswell, OR (US) 97426; Mickie L. Barnes, P. O. Box 426, Creswell, OR (US) 97426

( * ) Notice: Subject to any disclaimer, the term of this patent is extended or adjusted under 35 U.S.C. 154(b) by 0 days.

(21) Appl. No.: 10/060,891

(22) Filed: Jan. 29, 2002

(51) Int. Cl.[7] .................................................. B60N 2/26
(52) U.S. Cl. ...................... 297/256.17; 5/723; 297/229; 297/DIG. 6; 297/223
(58) Field of Search ........................... 297/219.1, 219.12, 297/223, 229, 228.12, 256.16, DIG. 6; 5/722, 723

(56) References Cited

U.S. PATENT DOCUMENTS

| | | | |
|---|---|---|---|
| 1,153,120 A | * | 9/1915 | Lackey .......................... 5/722 |
| 2,247,667 A | * | 7/1941 | Rosberger ....................... 5/723 |
| 4,416,462 A | | 11/1983 | Thompson |
| 4,630,863 A | * | 12/1986 | Roberts .................... 297/219.1 |
| 4,666,207 A | * | 5/1987 | Quartano .................... 297/229 |
| 4,844,540 A | * | 7/1989 | Pegram ....................... 297/229 |
| 5,086,529 A | * | 2/1992 | DeGroot ......................... 5/722 |
| 5,491,851 A | * | 2/1996 | Alonso ............................ 5/722 |
| 5,987,676 A | * | 11/1999 | Littleford et al. .............. 5/722 |
| 6,206,471 B1 | | 3/2001 | McGowan |
| 6,224,152 B1 | | 5/2001 | Hughes et al. |

* cited by examiner

*Primary Examiner*—Peter R. Brown
(74) *Attorney, Agent, or Firm*—Robert E. Howard

(57) ABSTRACT

A modular shopping cart cushion comprised of a plurality of generally rectangular pads, including end pads and interior pads. Each pad is releasably attachable to each adjacent pad by flexible hinge members. The hinge members have a width adapted to allow the pads to be folded up accordion-style with adjacent planar surfaces being in abutment to form a compact package for transport and storage. The modular cushion has a width and length adapted to fit into the primary cargo area of a shopping cart.

6 Claims, 2 Drawing Sheets

MODULAR SHOPPING CART CUSHION FOR INFANTS AND SMALL CHILDREN

BACKGROUND OF THE INVENTION

The present invention relates to a modular shopping cart cushion for infants and small children.

Shopping carts commonly found in grocery stores, discount stores, and other similar types of stores, have a primary cargo area with side walls, end walls, and a floor. Such carts also typically have a secondary cargo area, or shelf, located below the primary cargo area.

Such carts also usually have either a fold out or permanent child's seat at the rearward end of the primary cargo area, with openings in the rear end wall of the cart to accommodate extending a child's legs therethrough. Such seats, are hard and uncomfortable, and can be unsanitary, have burrs which can cause injury, or be wet, cold or hot if the cart has been stored outside.

In addition, while such seats can be used for small children who can at least sit up unaided, such seats are not satisfactory for infants who must either be held or laid in a prone position.

SUMMARY OF THE INVENTION

The present invention is a modular shopping cart cushion that can be used for comfortably seating small children or laying down an infant.

The modular cushion is comprised of a plurality of rectangular pads, each of which pads is adapted to be releasably connectable to an adjacent pad along at least one longitudinal edge. All of the pads have substantially the same width, the width of each pad being slightly less than the width of the child's seat of a shopping cart.

Two of the pads are end pads that have straps extending from their outer longitudinal edges that can be fastened to the horizontal rungs or vertical legs forming the typical grillwork sides or ends of a shopping cart.

Where it is desired to lay down an infant in the primary cargo area of a shopping cart, all of the pads are releasably connected to form an elongated cushion, the length of the elongated cushion being substantially the same as, or slightly longer than, the length of the floor of the primary cargo area of a shopping cart.

Where it is desired to have a young child sit in the child's seat of the shopping cart, a single end pad can be placed on the bottom of the seat and the straps fastened to the end of the cart or the back of the seat.

DESCRIPTION OF THE PREFERRED EMBODIMENTS

Figure 1:
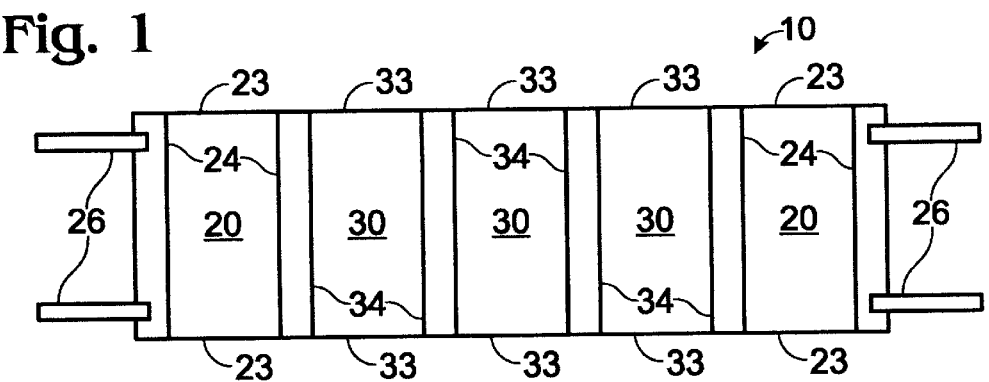
FIG. 1 is a top plan view of the modular cushion of the present invention with all of the pads thereof being releasably connected.

FIG. 1 illustrates the modular shopping cart cushion 10 of the present invention. Modular cushion 10 is comprised of two end pads 20 and a plurality of interior pads 30 disposed between end pads 20, adjacent pads being connected in a manner that will be described below. It is preferred that all of the pads 20 and 30 be generally rectangular in cross-section, and have a substantially identical width, length and thickness.

Figure 3:
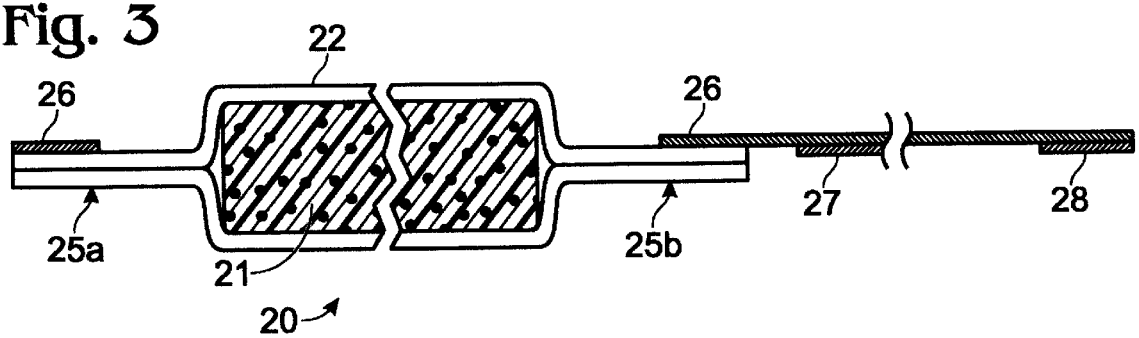
FIG. 3 is an enlarged side elevation view, partially in section, of an end pad of the cushion of the present invention.

One of the two identical end pads 20 is illustrated in FIG. 3. End pad 20 includes a resilient core 21, such as foam rubber, located within a pad case 22. Pad case 22 is preferably formed of a flexible, washable fabric. Pad case 22 is hemmed along both side edges 23, such as by stitching, and hemmed along both longitudinal edges 24, such as by stitching.

The hems along both longitudinal edges 24 extend outwardly to form flexible end pad hinge members 25. Hinge member 25a has a strip 26 of hook or loop fastener material sewn to one side thereof. The hook and loop fastener material may be of the type available under the trademark "VELCRO".

Hinge member 25b has fastener straps 26 attached thereto adjacent each end thereof, as best seen in FIG. 1. A strip 27 of the loop portion of a hook and loop fastening system is attached to the inner underside of straps 26 and a strip 28 of the hook portion of a hook and loop fastening system is attached to the outer underside of straps 26. Alternatively, the positions of the hook and loop strips could be reversed.

Figure 4:
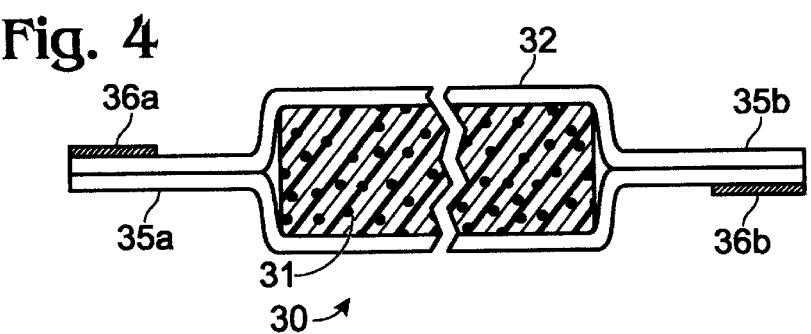
FIG. 4 is an enlarged side elevation view, partially in section, of an interior pad of the cushion of the present invention.

An interior pad 30 is shown in FIG. 4. Interior pad 30 includes a soft core 31, such as foam rubber, located within a pad case 32. Pad case 32 is preferably formed of a flexible, washable fabric. Pad case 32 is hemmed along both side edges 33, such as by stitching, and hemmed along both longitudinal edges 34, such as by stitching.

The hems along both longitudinal edges 34 extend outwardly to form flexible end pad hinge members 35. Hinge member 35a has a strip 36a of hook or loop fastener material sewn to the upper side thereof. Hinge member 35b has a strip 36b of hook or loop fastener material sewn to the lower side thereof. For sake of illustration, strip 36a is shown as being the hook portion and strip 36b is shown as the loop portion; however, these could be reversed.

In assembling end pads 20 and interior pads 30 into cushion 10, adjacent hinge members 25 and or 35 are overlapped in a manner adapted to bring the hook and loop fastening strips 26 and/or 36 into locking engagement to form cushion 10, as shown in FIG. 1. In FIG. 1 two end pads 20 and three interior pads 30, for a total of five pads, are shown as a preferred embodiment.

It has been found that a satisfactory size for pads 20 and 30 are ones that have a width of about 14 inches and a length of about 25 inches. However, the present invention is not to be construed as being limited to any particular size, the length being adapted to fit inside the primary cargo area or child's seating area of a shopping cart, and the width being adapted to be such that when two end pads 20 and a plurality of interior pads 30 are releasably attached together to form cushion 10, the total length of the cushion will be at least the length of the floor of the primary cargo area of a shopping cart.

Although a total of five pads has been found to be a preferred configuration, fewer than a total of five pads or more than a total of five pads may be employed, as long as the total of all the pads can form a cushion 10 length adapted to fit within the primary cargo area of a shopping cart as discussed above and which will be further described below.

Figure 2:
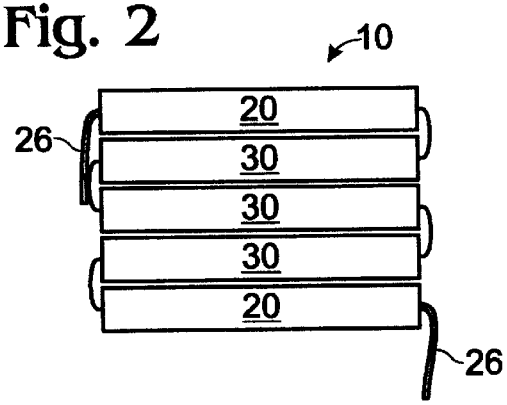
FIG. 2 is a side elevation view showing the cushion of the present invention folded up with all of the pads thereof being releasably connected.

FIG. 2 shows modular cushion 10 folded up for transport or storage. Hinges 25 and 35 are long enough to allow pads 20 and 30 to be folded up accordion-style with adjacent planar faces abutting each other to provide a compact package for carrying or storing.

Figure 5:
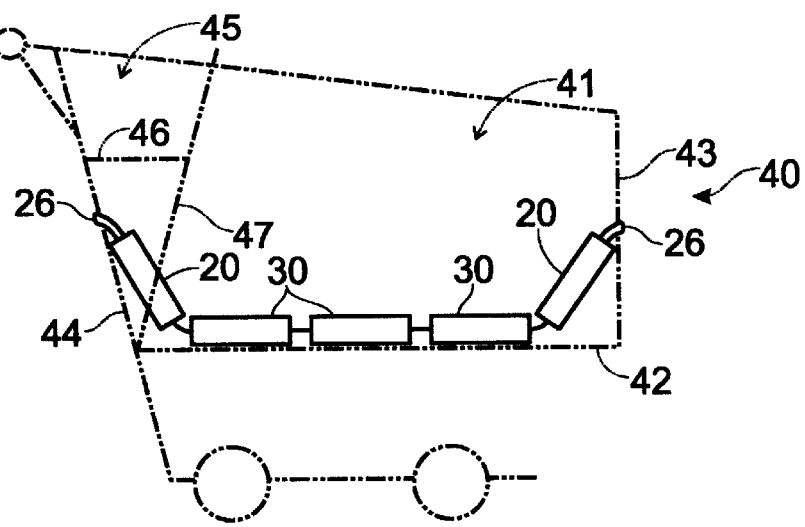
FIG. 5 is a side elevation view of the cushion of the present invention disposed in a first configuration within the primary cargo area of a shopping cart (shown in phantom outline)

FIG. 5 illustrates a first alternative configuration for placement of cushion 10 within the primary cargo area 41 of shopping cart 40, shown in phantom outline. In this configuration, adapted to allow an infant to be laid down within primary cargo area 41, interior pads 30 rest against the floor 42 of primary cargo area 41 and end pads 20 abut the front and rear end walls 43 and 44, respectively, of shopping cart 40. Straps 26 pass around adjacent rungs of front and rear end walls 43 and 44, and are fastened back on themselves by engaging the hook and loop fasteners 27 and 28.

Figure 6:
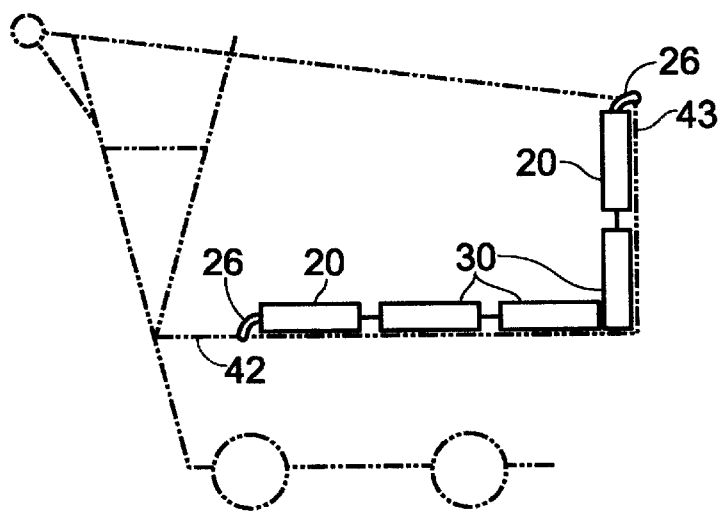
FIG. 6 is a side elevation view of the cushion of the present invention disposed in a second configuration within the primary cargo area of a shopping cart (shown in phantom outline)

FIG. 6 illustrates a second alternative configuration for placement of cushion 10 within the primary cargo area 41 of shopping cart 40, shown in phantom outline. In this configuration, adapted to allow a small child to sit up within the primary cargo area 41, the leading end pad 20 and adjacent interior pad 30 abut the front end wall 43 of primary cargo area 41 with straps 26 passing around the top rung of front end wall 43 and fastened back on themselves by engaging the hook and loop fasteners 27 and 28. The trailing end pad 20 and next two adjacent interior pads 30 abut the floor 42 of primary cargo area 41. Straps 26 of trailing end pad 20 pass around a rung in the floor 42 and are fastened back on themselves by engaging the hook and loop fasteners 27 and 28.

Figure 7:
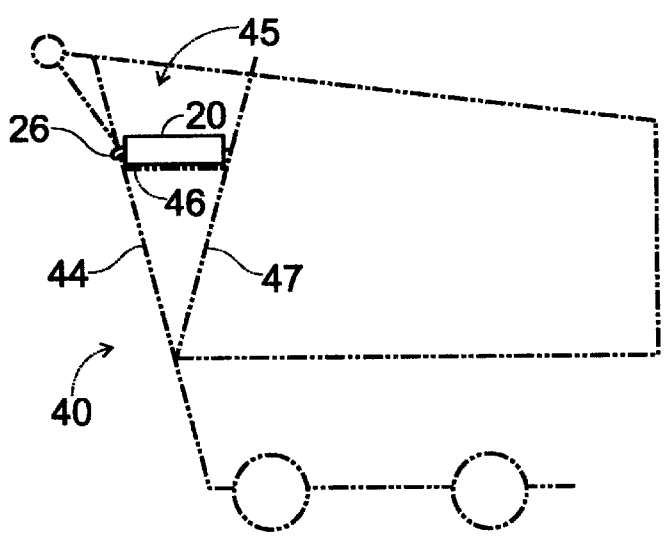
FIG. 7 is a side elevation view of an end pad of the cushion of the present invention disposed within the child's seat area of a shopping cart (shown in phantom outline).

FIG. 7 illustrates the use of a single end pad 20 as a bottom cushion in the child seat area 45. Child seat area 45 is comprised of a seat 46 fastened between rear end wall 44 of cart 40 and forwardly sloping wall 47. Straps 26 of end pad 20 pass around an adjacent rung of rear end wall 44 and are fastened back on themselves by engaging the hook and loop fasteners 27 and 28.

It will be obvious to those having skill in the art that many changes may be made to the details of the above-described embodiments of this invention without departing from the underlying principles thereof. The scope of the present invention should, therefore, be determined only by the following claims.

The invention claimed is:

1. In a shopping cart having a primary cargo area formed by a floor having a length and width, side walls and front and rear end walls, the improvement comprising:

a modular cushion for infants and small children positioned wholly within said primary cargo area of said shopping cart, said connected together to form an elongated cushion having front and rear ends, and front and rear end pads releasably attached to said front and rear ends, respectively, of said elongated cushion, said modular cushion having a length that is at least the length of the floor of said primary cargo area;

each of said interior pads and said end pads having side edges and longitudinally extending front and rear edges with front and rear flexible hinge members extending from said front and rear edges, respectively, said front and rear hinge members each having an upper and lower surface;

a strip of hook portion of hook and loop fastener material attached to one of said upper and lower surfaces of one of said front and rear hinge members of said interior pads, and a strip of loop portion of hook and loop fastener material attached to one of said upper and lower surfaces of the other of said front and rear hinge members;

a strip of hook portion of hook and loop fastener material attached to one of said upper and lower surfaces of said hinge member of one of said front and rear end pads, and a strip of loop portion of hook and loop fastener material attached to one of said upper and lower surfaces of said hinge member of the other of said front and rear end pads;

each of said plurality of interior pads being releasably attached to an adjacent interior pad or to an adjacent end pad along said strips of hook or loop fastener material attached to said flexible hinge members of said interior pads or said end pads, respectively;

each of said end pads having at least two straps extending therefrom, said straps being releasably fastened to an adjacent wall or floor of said shopping cart.

2. The shopping cart of claim 1 wherein each of said pads have a substantially identical width, length and thickness.

3. The shopping cart of claim 2 wherein said flexible hinge members have a width adapted to allow said pads to be folded up accordion-style with adjacent planar faces in abutment to thereby form a compact package for transport and storage.

4. The shopping cart of claim 3 wherein said compact package has a width and length substantially identical to the width and length of each of said pads, and a thickness substantially identical to the total thickness of all of said pads.

5. The shopping cart of claim 1 wherein each of said pads includes an inner core of resilient material and an outer case surrounding said inner core, said outer case being formed of a flexible, washable fabric, said case being hemmed along all edges.

6. The shopping cart of claim 1 wherein said strip of hook portion of hook and loop fastener material attached to said upper surfaces of one of said front and rear hinge members of said interior pads, and a strip of loop portion of hook and loop fastener material attached to said lower surface of the other of said front and rear hinge members.

* * * * *